United States Patent
Vaysman (10) Patent No.: US 10,311,458 B2
(45) Date of Patent: Jun. 4, 2019

(54) SYSTEM AND METHOD FOR DYNAMIC PERSONALIZATION OF ELECTRONIC COUPON DISTRIBUTION AND REDEMPTION VIA MOBILE DEVICE

(71) Applicant: Aintu, Inc, San Jose, CA (US)

(72) Inventor: Arthur Vaysman, San Jose, CA (US)

(73) Assignee: Aintu Inc., San Jose, CA (US)

( * ) Notice: Subject to any disclaimer, the term of this patent is extended or adjusted under 35 U.S.C. 154(b) by 153 days.

(21) Appl. No.: 14/306,186

(22) Filed: Jun. 16, 2014

(65) Prior Publication Data

US 2014/0372187 A1    Dec. 18, 2014

Related U.S. Application Data

(60) Provisional application No. 61/835,582, filed on Jun. 16, 2013.

(51) Int. Cl.
*G06Q 30/02* (2012.01)
*G06Q 30/06* (2012.01)

(52) U.S. Cl.
CPC ......... *G06Q 30/0211* (2013.01); *G06Q 30/02* (2013.01); *G06Q 30/06* (2013.01)

(58) Field of Classification Search
CPC .... G06Q 30/00; G06Q 30/02; G06Q 30/0207; G06Q 30/0211
USPC ............. 705/14.4, 14.1, 14.35, 14.39, 14.55; 723/23
See application file for complete search history.

(56) References Cited

U.S. PATENT DOCUMENTS

| | | | |
|---|---|---|---|
| 6,336,099 B1 | 1/2002 | Barnett et al. | |
| 6,915,271 B1* | 7/2005 | Meyer | G06Q 30/02 705/14.35 |
| 8,086,488 B2 | 12/2011 | Liu | |
| 8,275,657 B2 | 9/2012 | Main et al. | |
| 8,417,535 B2 | 4/2013 | Kusumoto et al. | |
| 2009/0259535 A1* | 10/2009 | Chow | G06Q 30/0207 705/14.39 |
| 2009/0307066 A1 | 12/2009 | Lonsbury et al. | |
| 2011/0145068 A1* | 6/2011 | King | G06F 17/211 705/14.55 |
| 2013/0024882 A1 | 1/2013 | Lee et al. | |

* cited by examiner

*Primary Examiner* — Marilyn G Macasiano
(74) *Attorney, Agent, or Firm* — HM Law Group LLP; Vani Moodley, Esq.

(57) ABSTRACT

A computer-implemented method for generating coupons is provided. The method comprises receiving a request for a coupon from a publisher; responsive to the request selectively generating a coupon, said coupon comprising: (a) a unique coupon id; (b) code associated with a clipping button which when executed on a customer device configured to display the coupon together with media content and an ad unit associated with the media content, causes the customer device to send a clipping notification message including the coupon id to the coupon server system upon selection of the clipping button by a customer; sending the coupon to the publisher for displaying with said media content on the customer device; receiving the coupon clipping notification message from the customer device upon selection of the clipping button by the customer; and creating an association between the coupon id in the coupon clipping notification and the customer.

18 Claims, 13 Drawing Sheets

SYSTEM AND METHOD FOR DYNAMIC PERSONALIZATION OF ELECTRONIC COUPON DISTRIBUTION AND REDEMPTION VIA MOBILE DEVICE

This application claims that the benefit of priority to prior U.S. provisional patent application No. 61/835,582 entitled "SYSTEM AND METHOD FOR DYNAMIC PERSONLIZATION OF ELECTRONIC COUPON DISTRIBUTION AND REDEMTION VIA MOBILE DEVICE", filed Jun. 16, 2013.

FIELD

Embodiments of the present invention relate to methods and systems generating coupons

BACKGROUND OF THE INVENTION

Advertisers (product manufacturers or service providers) issue and distribute coupons to encourage customers to purchase their products or to purchase products and services from them. With proliferation of mobile devices, increasing numbers of coupons are created for and distributed by mobile devices.

Because coupons are traditionally created, distributed, and most importantly redeemed in printed form—typically by a Point of Sale (POS) systems capable of scanning them, coupons in electronic form are not accepted by Brick and Mortar (BM) retailers as most existing POS systems are unable to receive coupon information from a mobile device.

SUMMARY OF THE INVENTION

This invention offers a system and method for advertisers to create and distribute text or multi-media based hyper-targeted, personalized electronic offers and coupons which can be accepted and redeemed by BM businesses in electronic form regardless of the capabilities of their existing POS system.

Furthermore, the system allows manufacturers to create unique, identifiable, and traceable coupons which can be used to launch and run self-tuning marketing campaigns designed to meet various business objectives.

The invented system takes advantage of proliferation of mobile devices, their network connectivity, ability to install new applications, digital footprints left by consumers, and the fact that electronic coupon redemption by BM businesses is done in proximity to a customer.

DETAILED DESCRIPTION OF THE INVENTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block or flow diagram form only in order to avoid obscuring the invention. Accommodate Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to the details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Figure 1:
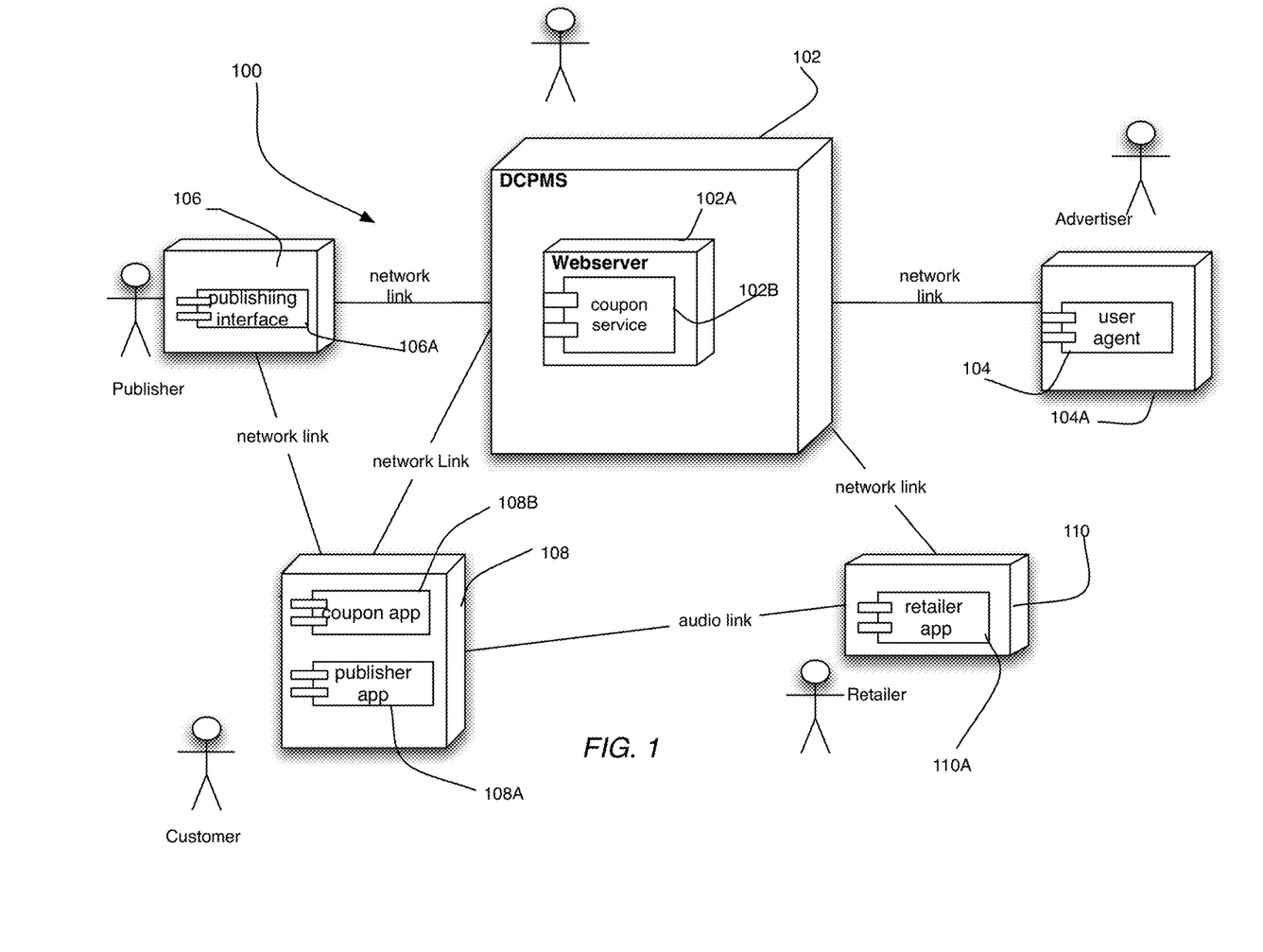
FIG. 1 shows a deployment drawing in accordance with one embodiment of the invention

FIG. 1 shows a deployment scenario 100 in accordance with one embodiment of the invention. Referring to FIG. 1 a Digital Coupon Personalization and Management System (DCPMS) 102 includes a server component 102A which implements a Coupon Service (CS) 102B. The CS 102B is under control of a Coupon Service Provider (CSP) A plurality of advertiser nodes 104 each equipped with an appropriate user agent (browser) 104A are communicatively coupled to the DCPMS 102 by means of a network link 112. In one embodiment, each advertiser node 104 may include a computing device such as a laptop or PC, and the network link 112 may comprise the Internet. Each advertiser node 104 represent an Advertiser who uses the CS to generate coupons on its behalf, as will be explained.

The DCPMS 102 may also be communicatively coupled with plurality of publisher nodes 106 by means of a network link 112. Each publisher node 106 represent a computing device such as a PC and includes a publishing interface 106A, which represent the mechanism whereby a Publisher is able to publish media on a customer node 108 for viewing by a Customer. Examples of Publishers includes CNN, Facebook, YouTube, etc.

The customer node 108 represents a customer device such as smartphone or tablet PC. In one embodiment, the customer node 108 may include a publisher app 108A and a coupon app 108B. The publisher app 108A may be configured to receive media content from a Publisher, as will be described more fully later. The media content may include a personalized coupon generated by the DCPMS 102.

Finally, the deployment scenario 100 also includes a retailer node 110 which represents retailer. In one embodiment, the customer node 108 communicates with the retailer node 110 via an audio link 114.

Figure 2:
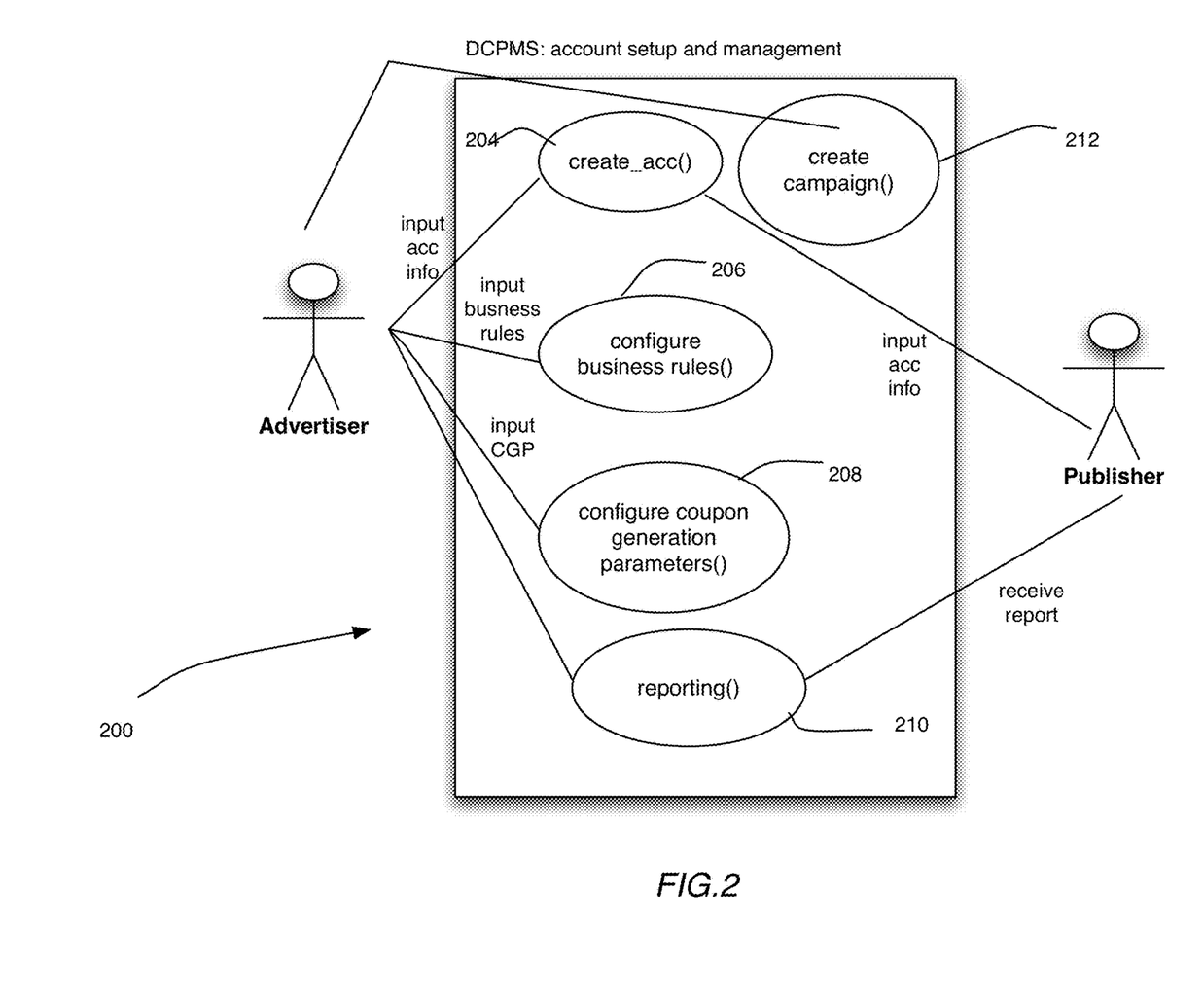
FIG. 2 shows the use cases for the DCPMS, in accordance with one embodiment of the invention.

FIG. 2 shows use cases 200 for the DCPMS 102, in accordance with one embodiment of the invention. As will be seen, the DCPMS 102 supports a create_account( ) function 202 which allows an Advertiser and a Publisher to create user accounts on the DCPMS 102. A configure_business_rules( ) function 208 allows an Advertiser to provision business rules and objectives in the DCPMS 102. The business rules and objectives may be used to generate highly personalized coupons for publishing to particular customers, as will be described. The use cases 200 also includes a configure_coupon_generation_parameters( ) process 210 whereby an advertiser configures coupon generation parameters which are used to generate personalized coupons. Examples of coupon generation parameters include the following:

(a) Demographic data;
(b) Geographic data;
(c) Offer size for a coupon offer. This may be specified in the terms of a minimum offer size and a maximum offer size;
(d) The particular medium for which a coupon needs to be generated. Examples of media include video content, banner ads, and printed ads.
(e) Publisher. Examples of publishers includes Facebook, YouTube, CNN etc.;
(f) Context for the coupon. Examples of contexts includes sports, politics, science, business, lifestyle, etc.;
(g) Psycho-graphic information comprising values, opinions, attributes, interests, and lifestyles associated with a target demographic group.

Finally, the use cases 200 include a reporting function 212 whereby reports are generated for Advertisers and Publishers.

Figure 3:
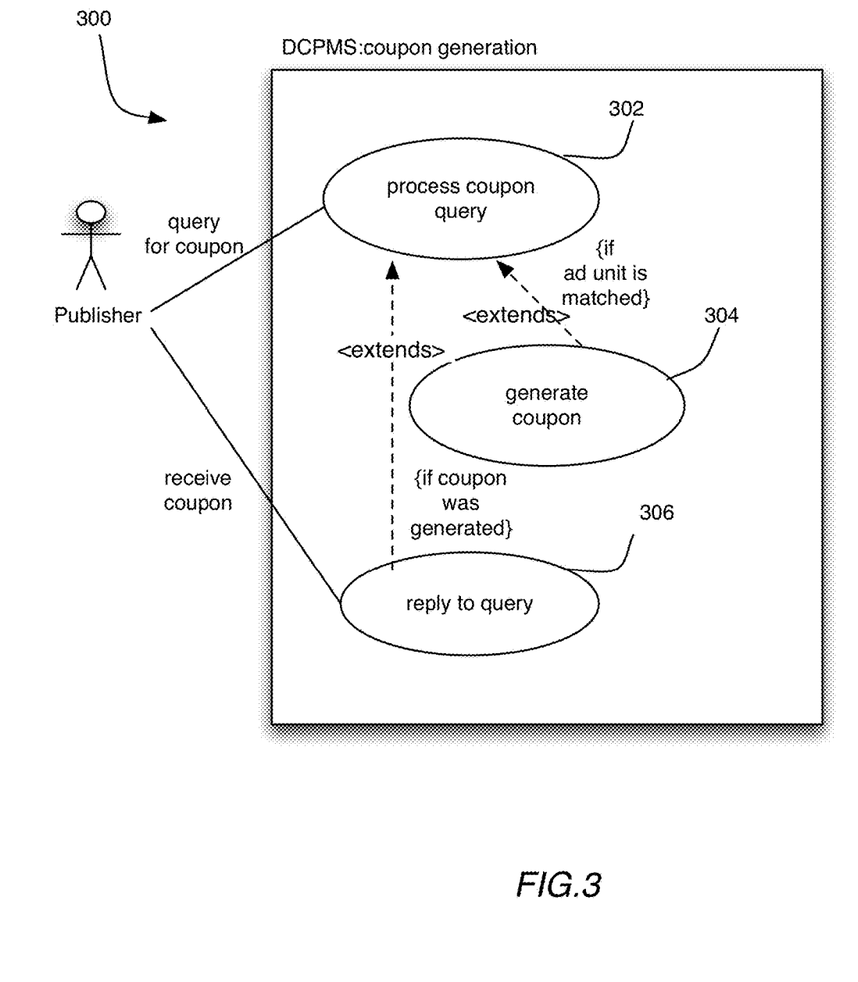
FIG. 3 shows the use cases for coupon generation, in accordance with one embodiment of the invention.
Figure 5:
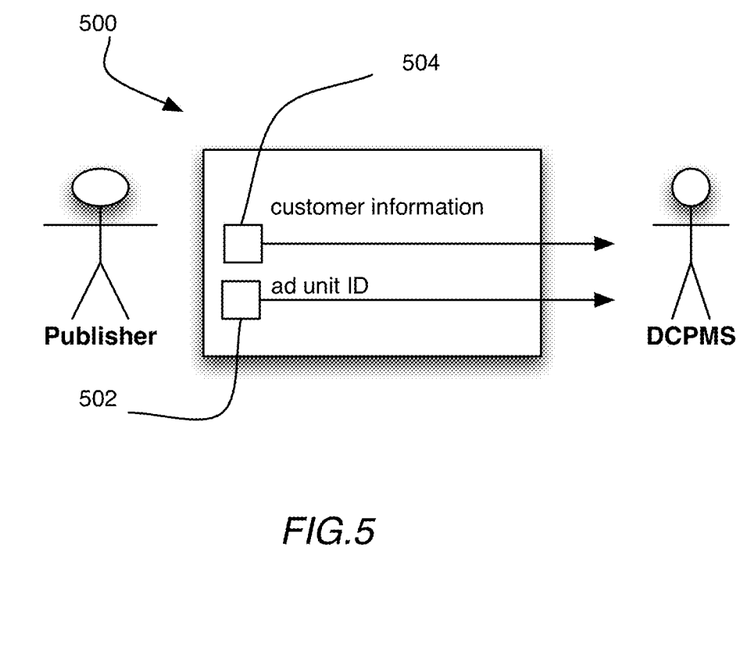
FIG. 5 shows a coupon query Q1, in accordance with one embodiment of the invention.
Figure 7A:
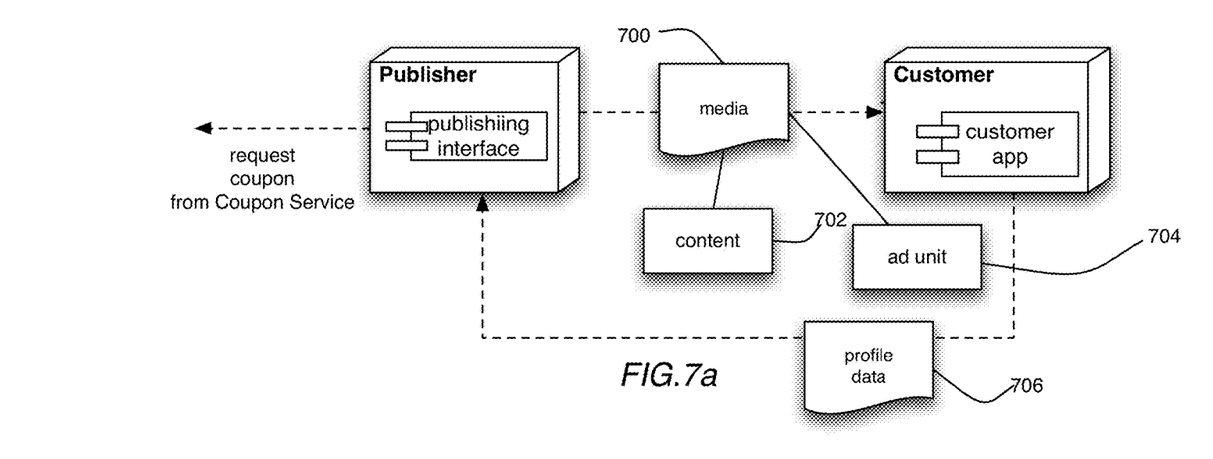
FIGS. 7*a-b* shows a Publisher publishing media on a Customer node, in accordance with one embodiment of the invention.

Referring now to FIG. 3 of the drawings, there is shown use cases 300 for coupon generation, in accordance with one embodiment of the invention. In terms of the use cases 300, a Publisher sends a query Q1 to the DCPMS 102. The query Q1 is a request for a coupon. Generally, at the time of sending the query Q1, the Publisher is already publishing content to a customer and is the further, typically displaying an advertisement unit (ad unit) in association with the content. This can be seen in FIG. 7a, which shows media 700 being published on a customer node 108, wherein the media 700 includes content 702 and an ad unit 704. FIG. 5 shows the elements of the query Q1, in one embodiment. As will be seen, Q1 includes customer information 500 and an ad unit id 502. The ad unit id 502 corresponds to the ad unit being shown to the Customer. The customer information corresponds to profile information/data 706 (see FIG. 8) about the Customer. The profile data 706 is collected from the Customer node 108 by the Publisher and includes that customer's browsing behavior and information about the customer device itself Responsive to receiving the coupon query Q1, the DCPMS 102 executes a process coupon query block 304. Under this block, the DCPMS 102 attempts to match the ad unit id in the coupon query Q1 in an ad unit list. The ad unit list is provisioned by an Advertiser and is basically a listing of ad units for which coupons must be generated by DCPMS 102. Thus, under the process 304, if the ad unit id is matched then a generate coupon function 306 is executed. Under this process, a personalized coupon is generated based on the coupon configuration parameters and based on machine learning techniques.

Figure 7B:
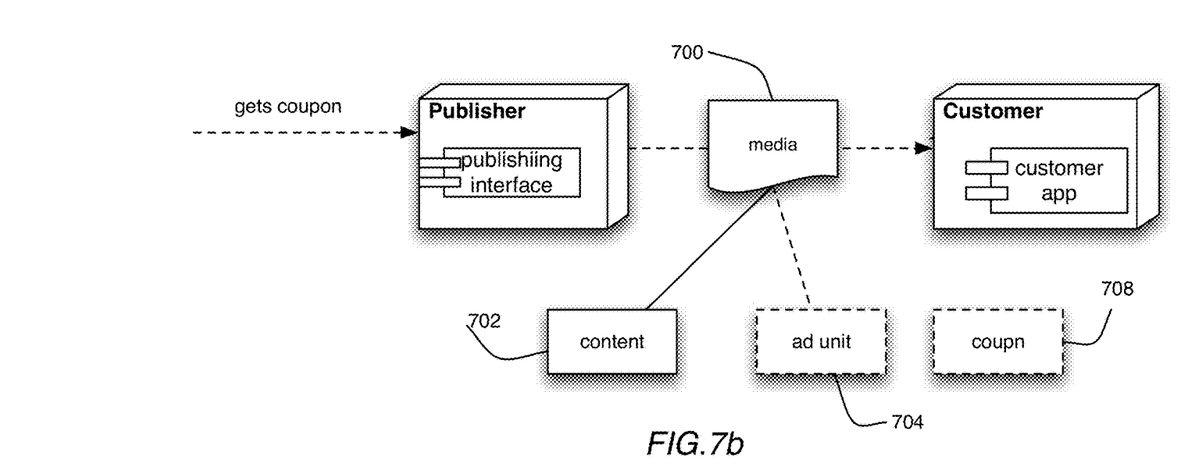

The use cases 300 also include a reply to query function 308 wherein the DCPMS 102 replies to the query Q1 by returning a coupon to the publisher 302 or a reply indicating that no coupon is available for the particular ad unit associated with the coupon request Q1. FIG. 7B shows the media 700 that is published on a customer node 108 as updated by the Publisher to include a coupon 708.

Figure 4:
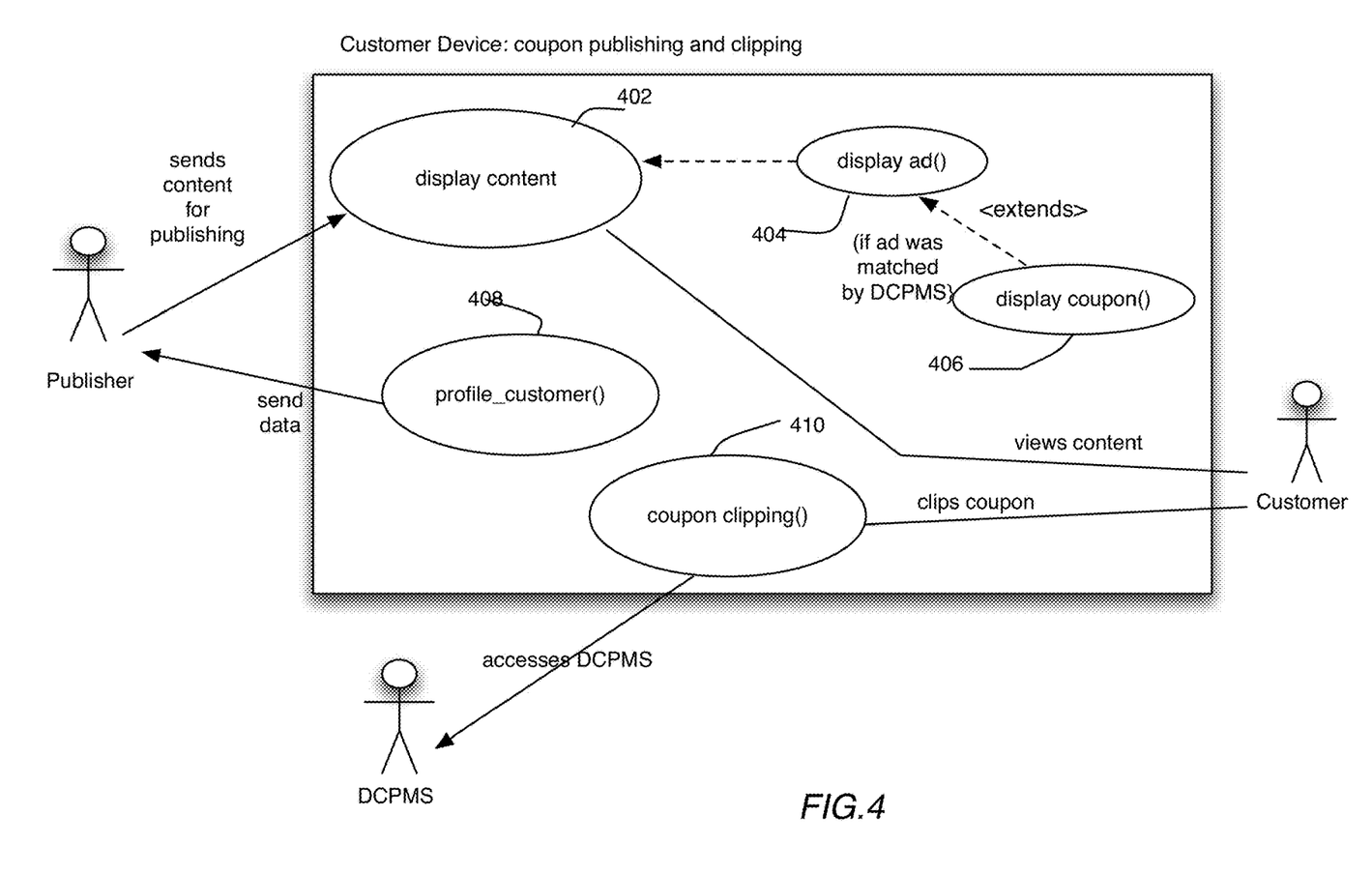
FIG. 4 shows the use cases for coupon clipping and publishing in accordance with one embodiment of the invention.

FIG. 4 shows use cases 400 for coupon displaying and clipping on the customer node 402, in accordance with one embodiment of the invention. As will be seen, the customer node 108 is configured to display content by executing a display content function 402. The display content function 402 may be extended to include a display ad function 404 which in turn may be extended to include a display coupon function 406 if the ad unit associated with the ad being displayed is match by the DCPMS 102, as described earlier. A profile customer( ) function 408 collects profile information for a customer which is transmitted to the Publisher. The use cases 400 also includes a coupon clipping( ) function 410. Under the coupon clipping function 410, a Customer performs a 'clipping action' in relation to a coupon. For example, in one embodiment, the clipping action may include selection of a clipping button associated with the coupon. Responsive to said clipping action, the coupon clipping function 410 generates a coupon clipping notification and transmits it to the DCPMS 102.

Figure 8:
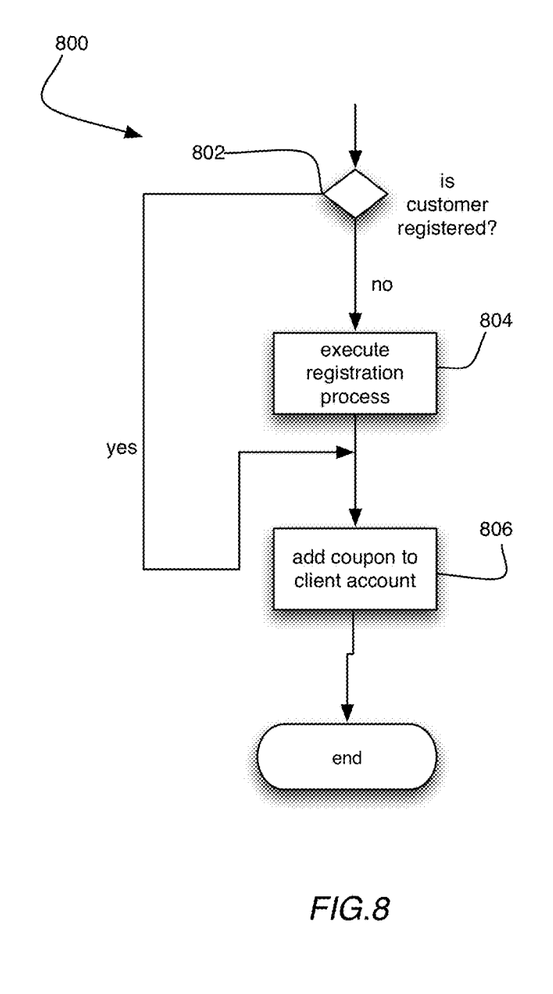
FIG. 8 shows a flowchart for processing a coupon clipping notification, in accordance with one embodiment of the invention.

Referring now to FIG. 8 of the drawings, there is shown a process 800 executed on the DCPMS 102 responsive to receiving a coupon clipping notification. At block 802, a check is made to determine if the customer is a registered customer. In one embodiment this step includes validating customer credentials included in the coupon clipping notification. If it is determined that the customer was not registered, then at block 804, a registration process is executed in order to register the customer. This process may include redirecting a customer to a registration page in order for the customer to input registration information. At block 806, the coupon identified by the coupon id in the coupon clipping notification is added to the customer's account. At this point, the DCPMS 102 may inform the Publisher that the coupon has been clipped, in which case the publisher may instruct a browser being used by the customer node 108 to view the coupon to stop displaying the coupon.

In the case where a Customer is using the coupon app 108B to view the published content, the coupon app 108B includes logic to stop showing the coupon as soon as the coupon clipping action is performed. Thus, a seamless coupon clipping experience is facilitated.

Figure 9A:
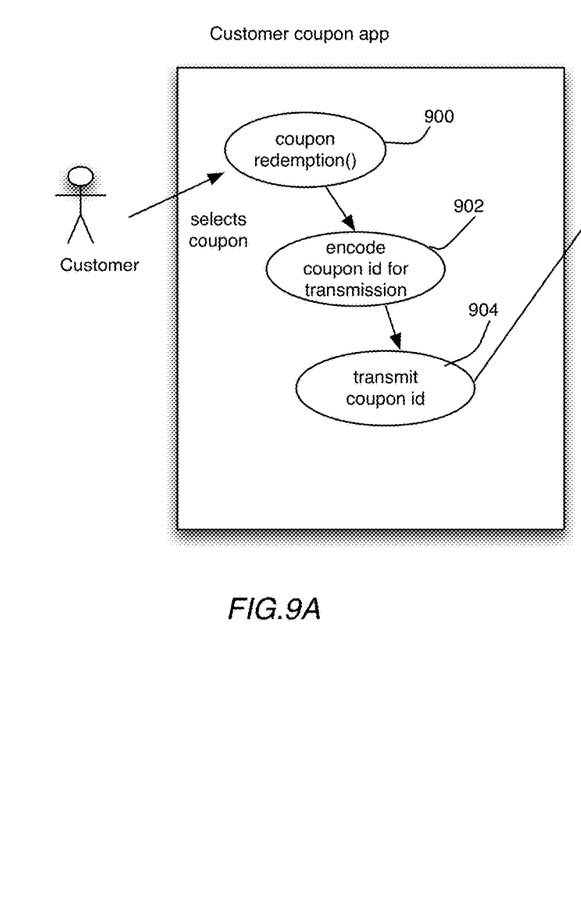
FIG. 9A shows the use cases for coupon redemption by the customer coupon app, in accordance with one embodiment of the invention.
Figure 9B:
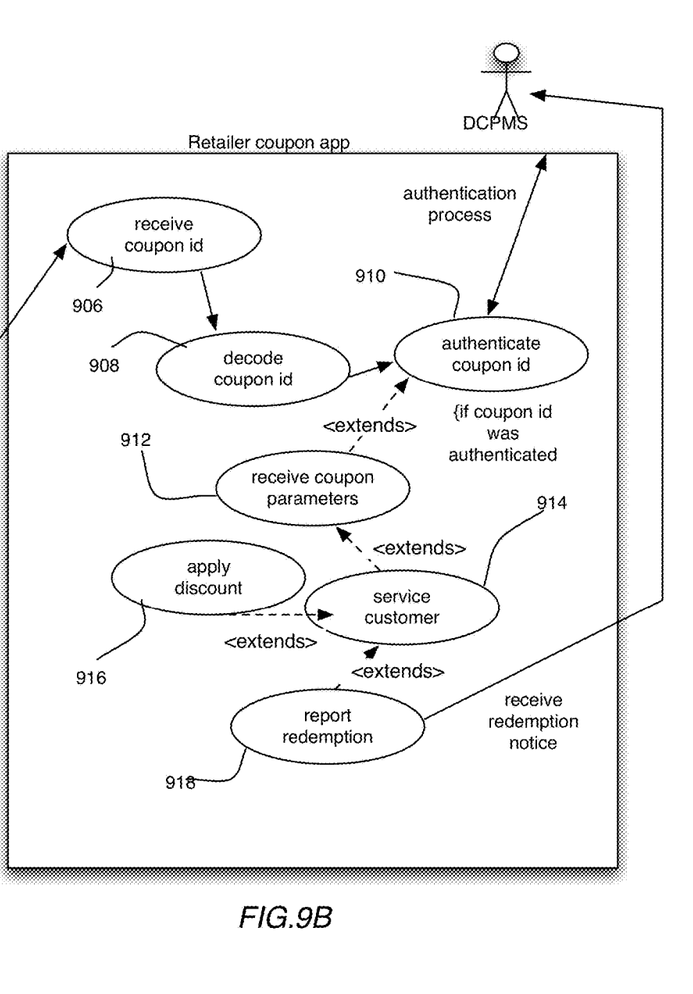
FIG. 9B shows the use cases for coupon redemption by the retailer coupon app, in accordance with one embodiment of the invention.

Referring now to FIG. 9A of the drawings, there is shown a use case for coupon redemption by a Customer. As will be seen, a coupon redemption( ) function 900 includes a process 902 for encoding a coupon for transmission, and a process 904 for transmitting said encoded coupon to a retailer node. In one embodiment, the process 902 for encoding the coupon for transmission encodes the coupon as an audio signal which is then transmitted via a speaker associated with the customer node 108. The retailer node 110 then uses a microphone to detect the audio encoding. FIG. 9B also shows a use case for the retailer coupon app 110A to redeem a coupon, in accordance with one embodiment. Referring to FIG. 9B, process 906 comprises a receive coupon id( ) function whereby a microphone of the retailer node 110 is used to listen for the coupon transmission from the customer node 108. A decode coupon id( ) process 908 decodes the audio signal in order to extract the coupon id. An authenticate coupon id( ) process 910 includes transmission of the coupon id to the DCPMS 102 by the retailer coupon app for authentication. The DCPMS 102 authenticates the coupon id and returns coupon parameters associated with the coupon id that was authenticated. The retailer coupon app then executes a receive coupon parameters( ) function 912 to receive the coupon parameters from the DCPMS 102. A service customer( ) function 914 includes servicing the customer by providing the goods and/or services associated with the coupon. A apply discount( ) function 916 extends the service customer( ) function 914 to apply the discount indicated in the coupon to the transaction with the customer. A report redemption( ) function 918 includes operations to report any coupon redemption to the DCPMS 102.

Figure 6:
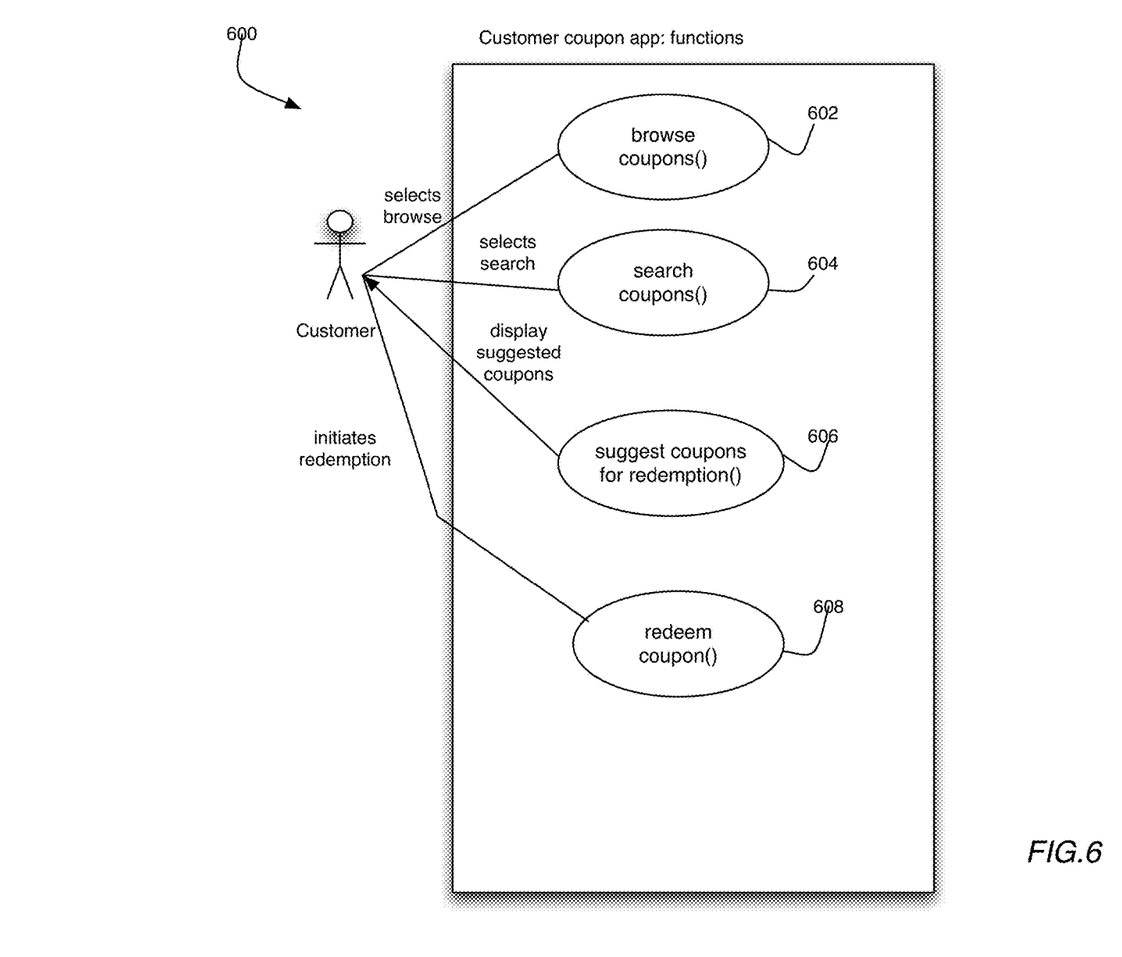
FIG. 6 shows the use cases for the customer coupon app, in accordance with one embodiment of the invention.

Referring now to FIG. 6 of the drawings, use cases 600 are associated with the coupon app 108B. As will be seen, the use cases 600 may include a browse coupons( ) function 602. This function allows a Customer to browse previously clipped coupons. A search coupon( ) function 604 allows the Customer to search for particular coupons based on search criteria. A suggest coupon for redemption( ) function 608 implements functionality to proactively suggest coupons for redemption to a Customer. For example, in one embodiment based on the location, the Customer may be shown coupons that are only available for redemption at that particular location. Finally, the use case 600 includes a redeem coupon function( ) 610, whereby the Customer may redeem a selected coupon, as has been described above.

Figure 10:
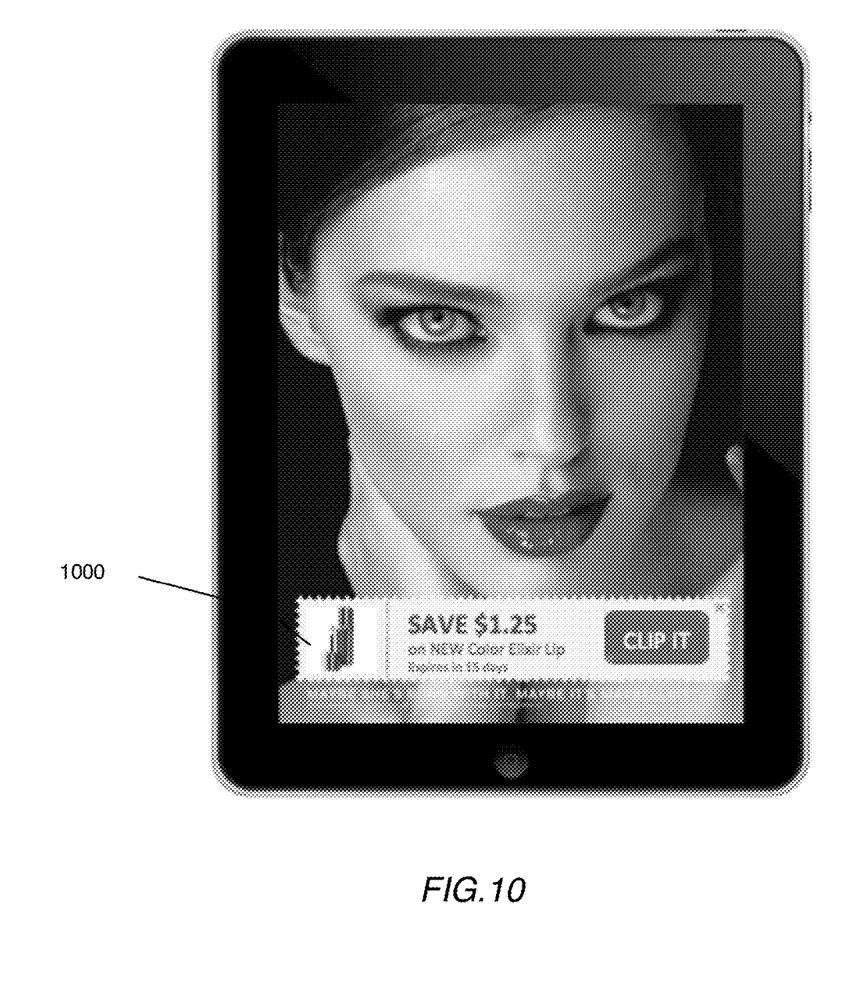
FIG. 10 shows an example of published coupon, in accordance with one embodiment of the invention.
Figure 11:
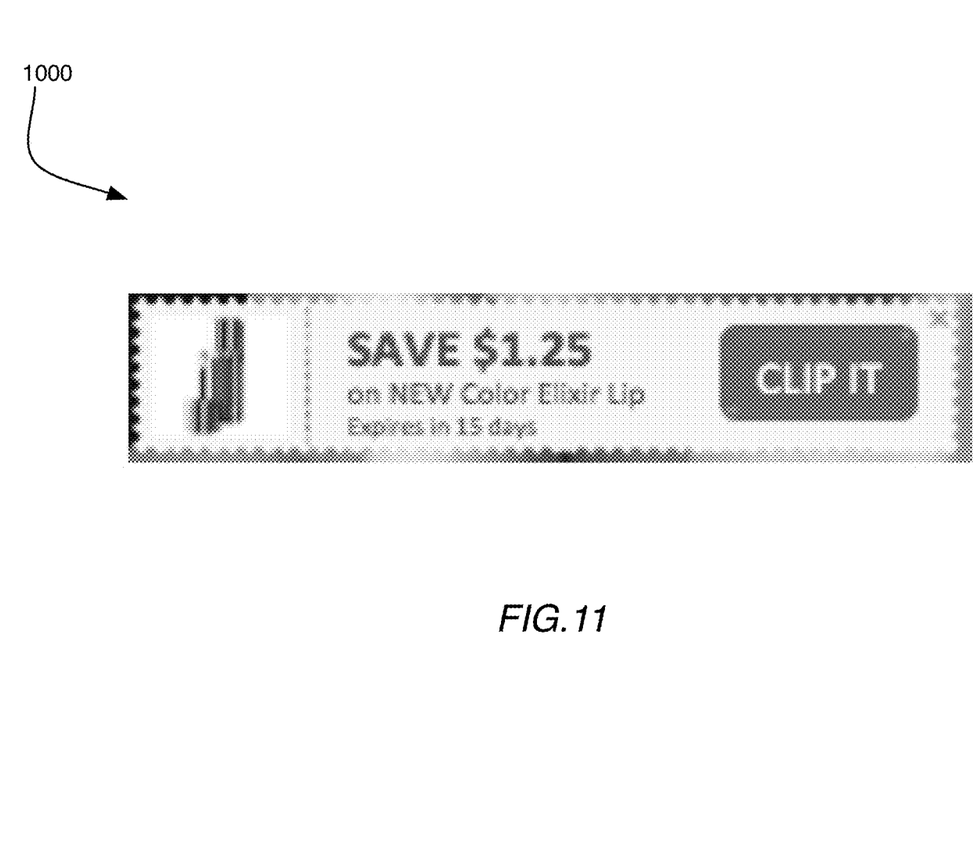
FIG. 11 shows the published coupon of FIG. 10 in magnified view, in accordance with one embodiment of the invention.

Referring now to FIG. 10 of the drawings, there is shown a coupon 1000 which is published in association with an advertisement for women's' lipstick. The coupon 1000 is shown in magnified view FIG. 11 of the drawings. As will be seen, the coupon 1000 includes a discount of $1.25, and a coupon expiration, which is set to 15 days. Further, the coupon 1000 includes a 'clip it button'. This button may be used to clip the coupon 1000 in accordance with the techniques disclosed herein.

Figure 12:
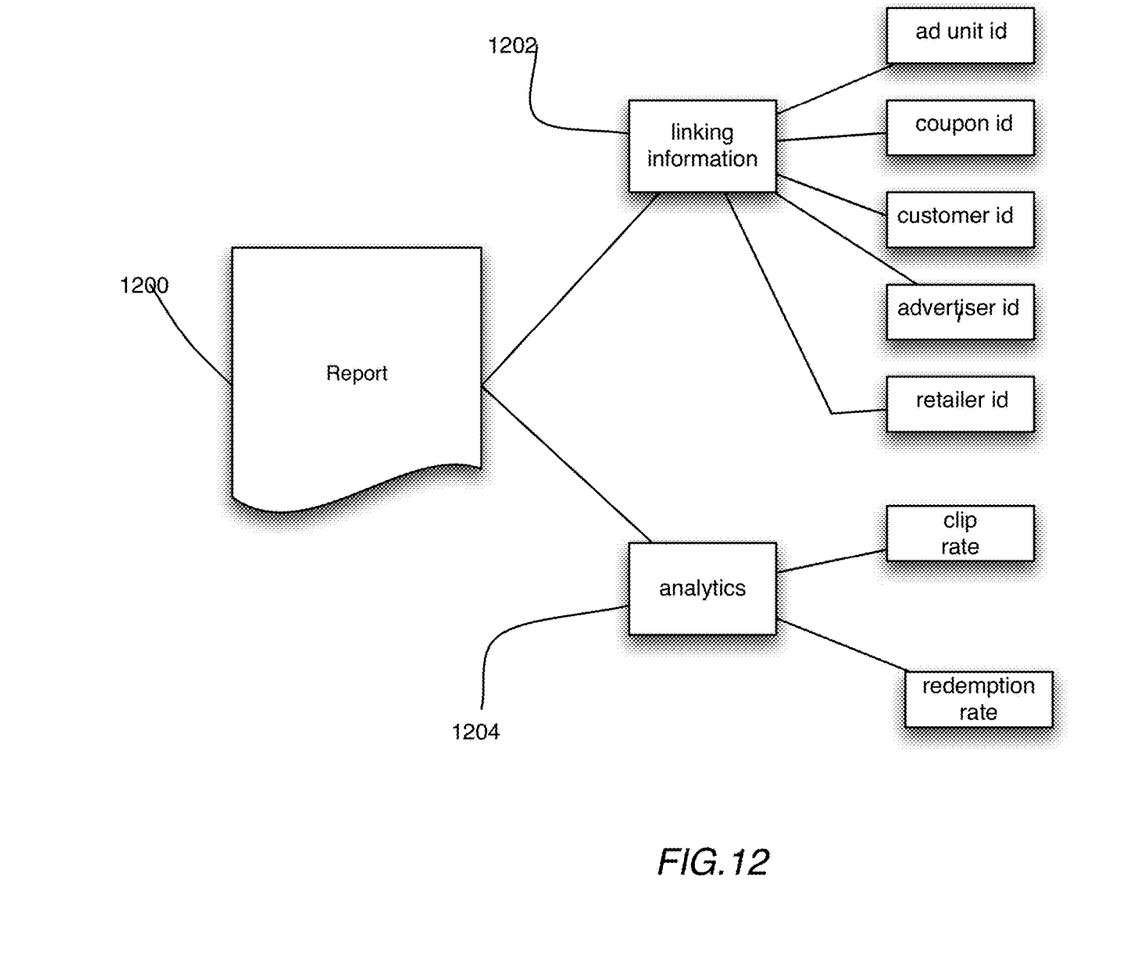
FIG. 12 shows an example of a report to an Advertiser, in accordance with one embodiment of the invention.

FIG. 12 shows a report 1200 that may be generated for an Advertiser, in accordance with one embodiment. The report 1200 includes linking information 1202 to link ad unit id, coupon id, customer id, advertiser id, and retailer id. Report 1200 also includes an analytics component 1204 which may provide detailed analysis on a coupon's clip rate and its redemption rate. The coupon clip rate and redemption rate may be used to optimize a coupon campaign. As has been mentioned, machine running techniques are used to generate a coupon in a dynamic fashion. For example, coupon may be configured to have a certain clip rate and a certain redemption. If a clip rate for a coupon is too high the system may dynamically reduce the discount associated with the coupon in order to throttle or scale back the redemption rate. Alternatively, if the coupon clip rate is too low, then the DCPM 102 S may dynamically increase the discount associated with the coupon in order to achieve the desired clip rate. Likewise, a coupons redemptions rate may be used to dynamically scale the offer sized associated with the coupon in order to achieve a desirable redemption rate.

Figure 13:
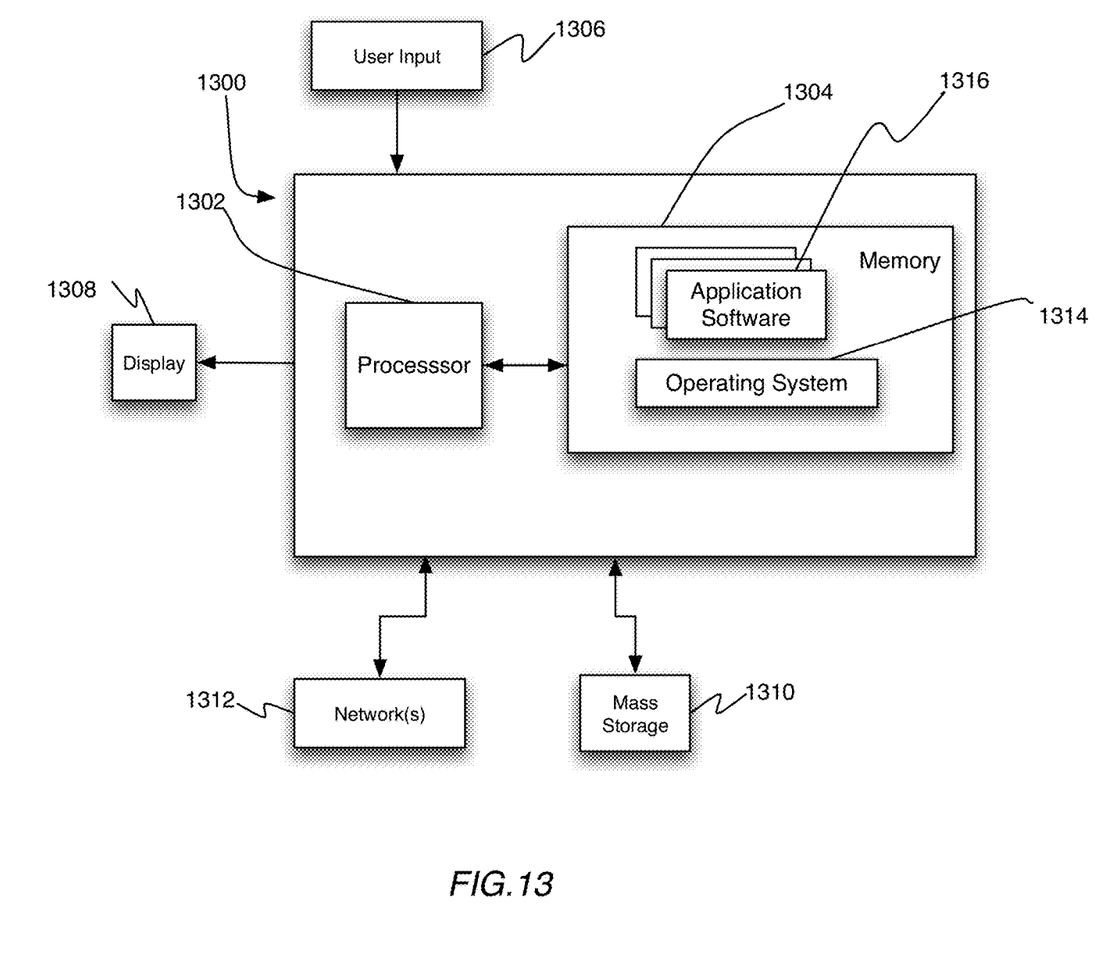
FIG. 13 shows a high-level block diagram of hardware for implementing the DCPMS, in accordance with one embodiment of the invention.

FIG. 13 shows an example of hardware 1300 that may be used to implement the DCPMS 102 in accordance with one embodiment. The hardware 1300 may include at least one processor 1302 coupled to a memory 1304. The processor 1302 may represent one or more processors (e.g., microprocessors), and the memory 1304 may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory 1304 may be considered to include memory storage physically located elsewhere in the hardware, e.g. any cache memory in the processor 1302, as well as any storage capacity used as a virtual memory, e.g., as stored on a mass storage device.

The hardware also typically receives a number of inputs and outputs for communicating information externally. For interface with a user or operator, the hardware may include one or more user input output devices 1306 (e.g., a keyboard, mouse, etc.) and a display 1308. For additional storage, the hardware 1300 may also include one or more mass storage devices 410, e.g., a Universal Serial Bus (USB) or other removable disk drive, a hard disk drive, a Direct Access Storage Device (DASD), an optical drive (e.g. a Compact Disk (CD) drive, a Digital Versatile Disk (DVD) drive, etc.) and/or a USB drive, among others. Furthermore, the hardware may include an interface with one or more networks 1312 (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces between the processor 1312 and each of the components, as is well known in the art.

The hardware 1300 operates under the control of an operating system 1314, and executes application software 1316 which includes various computer software applications, components, programs, objects, modules, etc. to perform the techniques described above.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-

The invention claimed is:

1. A computer-implemented method for generating coupons and tracking coupons redemptions by a coupon server system, comprising:
   receiving a request for a coupon from a publisher;
   responsive to the request selectively generating a coupon, said coupon comprising:
      (a) a unique coupon id;
      (b) a clipping button which is displayed on a customer device together with the coupon and media content and an ad unit associated with the media content;
   executing a code associated with the clipping button when selected by a customer, wherein the code when executed on the customer device causes the customer device to send a clipping notification message to the coupon server system which includes the coupon id and indicates redemption of the coupon;
   sending the coupon to the publisher for displaying with said media content on the customer device;
   receiving the coupon clipping notification message from the customer device upon selection of the clipping button by the customer; and
   creating an association between the coupon id in the coupon clipping notification and the customer, wherein value of the coupon is dynamically changed based on a frequency of the selection of the clipping button.

2. The method of claim 1, further comprising instructing a user agent of the customer device to stop displaying the coupon whilst continuing to display the media content upon receipt of the coupon id.

3. The method of claim 1, further comprising maintaining a list of clipped coupons for the customer.

4. The method of clime 3, further comprising updating the list of clipped coupons by addition of the coupon associated with the coupon id in the clipping notification to said list.

5. The method of claim 1, wherein selectively generating the coupon is based upon coupon generation settings provisioned in the coupon server system by an advertiser, and associated with the ad unit.

6. The method of claim 1, wherein the coupon generation settings comprise coupon generation parameters and coupon generation rules.

7. The method of claim 6, wherein the coupon generation parameters are selected from the group consisting of demographic data; geographic data; offer size for a coupon, media type, publisher, context for the coupon, and psycho-graphic including values, opinions, attributes, interests, and lifestyles associated with a target demographic group.

8. The method of claim 1, further comprising receiving a coupon authentication request from a retailer who was presented with a coupon id for redemption of a coupon associated with said coupon id, said coupon authentication request comprising said coupon id;
   responsive to the coupon authentication request, performing an authentication operation to authenticate the coupon id; and
   if the coupon id is authenticated then transmitting coupon parameters for the coupon associated with the coupon id to the retailer.

9. The method of claim 8, further comprising tracking coupon redemptions including receiving a redemption notification message from a retailer who redeemed a coupon, said redemption notification message including a coupon id of a coupon associated with the redemption, a retailer id for the retailer who redeemed the coupon, and a customer id for the customer who presented the coupon to the retailer for redemption; and
   mapping said coupon id, retailer id, and a customer id to the ad unit and the advertiser associated with said coupon.

10. A coupon server system, comprising:
   a processor; and
   a memory for storing instructions which when executed by the processor causes the coupon server system to perform a method for generating coupons and tracking coupons redemptions, comprising:
   receiving a request for a coupon from a publisher;
   responsive to the request selectively generating a coupon, said coupon comprising:
      (a) a unique coupon id;
      (b) a clipping button which is displayed on a customer device together with the coupon and media content and an ad unit associated with the media content;
   executing a code associated with the clipping button when selected by a customer, wherein the code when executed on the customer device causes the customer device to send a clipping notification message to the coupon server system which includes the coupon id and indicates redemption of the coupons;
   sending the coupon to the publisher for displaying with said media content on the customer device;
   receiving the coupon clipping notification message from the customer device upon selection of the clipping button by the customer; and
   creating an association between the coupon id in the coupon clipping notification and the customer, wherein value of the coupon is dynamically changed based on a frequency of the selection of the clipping button.

11. The system of claim 10, wherein the method further comprises instructing a user agent of the customer device to stop displaying the coupon whilst continuing to display the media content upon receipt of the coupon id.

12. The system, of claim 10, wherein the method further comprises maintaining a list of clipped coupons for the customer.

13. The system of claim 12, wherein the method further comprises updating the list of clipped coupons by addition of the coupon associated with the coupon id in the clipping notification to said list.

14. The system of claim 10, wherein selectively generating the coupon is based upon coupon generation settings provisioned in the coupon server system by an advertiser, and associated with the ad unit.

15. The system of claim 10, wherein the coupon generation settings comprise coupon generation parameters and coupon generation rules.

16. The system of claim 15, wherein the coupon generation parameters are selected from the group consisting of demographic data; geographic data; offer size for a coupon, media type, publisher, context for the coupon, and psycho-graphic including values, opinions, attributes, interests, and lifestyles associated with a target demographic group.

17. The system of claim 10, wherein the method further comprises receiving a coupon authentication module request from a retailer who was presented with a coupon id for redemption of a coupon associated with said coupon id, said coupon authentication request comprising said coupon id;

responsive to the coupon authentication request, performing an authentication operation to authenticate the coupon id; and if the coupon id is authenticated then transmitting coupon parameters for the coupon associated with the coupon id to the retailer.

18. The system of claim 17, wherein the method further comprises tracking coupon redemptions including receiving a redemption notification message from a retailer who redeemed a coupon, said redemption notification message including a coupon id of a coupon associated with the redemption, a retailer id for the retailer who redeemed the coupon, and a customer id for the customer who presented the coupon to the retailer for redemption; and mapping said coupon id, retailer id, and a customer id to the ad unit and the advertiser associated with said coupon.

* * * * *